United States Patent [19]

Hughes

[11] 4,439,852
[45] Mar. 27, 1984

[54] DISC PLAYER HAVING RECORD HANDLING APPARATUS

[75] Inventor: Larry M. Hughes, Indianapolis, Ind.

[73] Assignee: RCA Corporation, New York, N.Y.

[21] Appl. No.: 374,377

[22] Filed: May 3, 1982

[51] Int. Cl.³ .......................................... G11B 17/04
[52] U.S. Cl. ................................................ 369/77.2
[58] Field of Search ................... 369/75, 77, 191, 201, 369/75.1, 77.2, 77.1

[56] References Cited

U.S. PATENT DOCUMENTS

| 2,523,157 | 9/1950 | Somma | 369/202 |
| 3,108,812 | 10/1963 | Rabinow | 369/265 |
| 4,098,511 | 7/1978 | Leedon | 274/9 |
| 4,124,866 | 11/1978 | Coleman | 358/128 |
| 4,133,540 | 1/1979 | Torrington | 274/9 |
| 4,196,906 | 4/1980 | Torrington | 274/9 |
| 4,326,284 | 4/1982 | Elliott | 369/268 |

OTHER PUBLICATIONS

U.S. Pat. Application Ser. No. 148,304, Elliott.

Primary Examiner—Steven L. Stephan
Attorney, Agent, or Firm—E. M. Whitacre; J. S. Tripoli; D. A. Kulkarni

[57] ABSTRACT

A record handling mechanism in a disc record playback system includes a record lifting finger which rises through a slot in the turntable to lift a record against a pair of stops located above a set of record receiving pads. The record receiving pads are then retracted out of the way, and the record lifting finger is lowered to a position below the turntable to transfer the record to the turntable. The operating sequence is reversed to restore the record back on the receiving pads.

10 Claims, 13 Drawing Figures

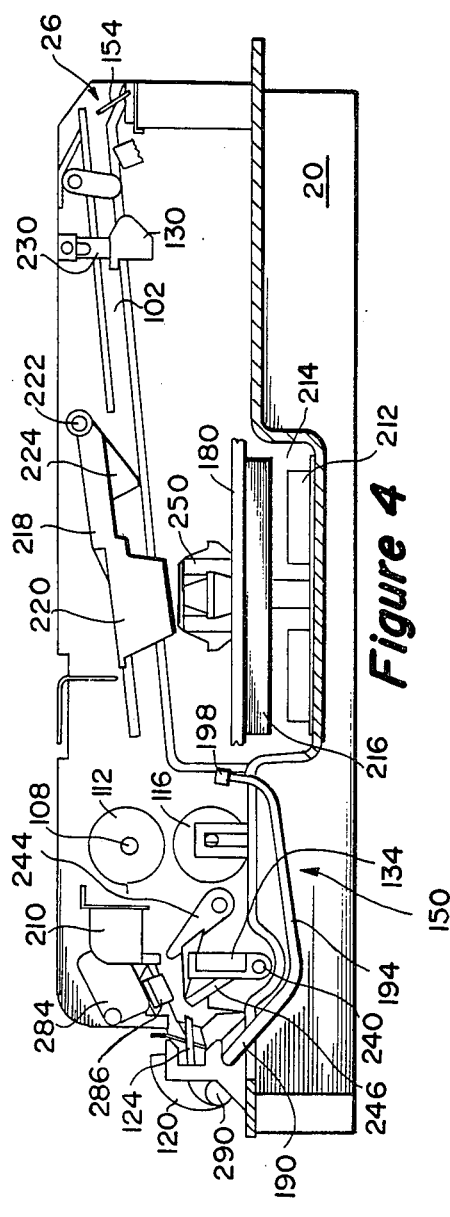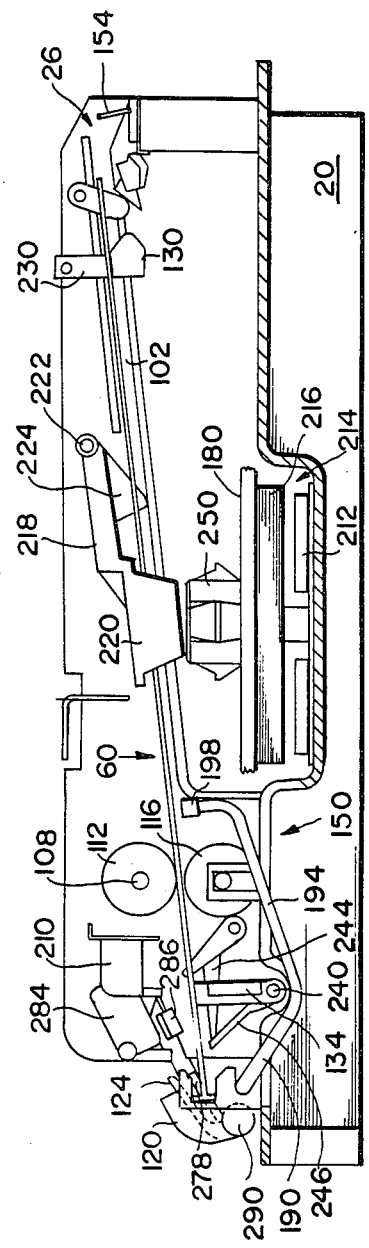

DISC PLAYER HAVING RECORD HANDLING APPARATUS

This invention generally relates to a record playback system, and more particularly, it relates to a mechanism for transferring a record to and from a turntable.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver. A capacitance-type system is illustratively disclosed in U.S. Pat. No. 3,842,194 (Clemens).

It is beneficial to enclose a video disc-type record in a caddy which comprises a record retaining spine removably located within an outer jacket or sleeve. The record retaining spine has an opening in which a record is received to form a record/spine assembly. For record loading, a full caddy is inserted into an input slot provided in the player. A record extracting mechanism disposed in the player removes the record/spine assembly from the caddy during subsequent jacket withdrawal, whereby the record is retained in the player resting on a set of record receiving pads. The retained record is then transferred to the turntable for playback. For record retrieval, the record is transferred back to the receiving pads, and an empty jacket is reinserted into the player to recapture the record/spine assembly.

U.S. Pat. No. 4,196,906 (Torrington) shows one type of record transferring mechanism which employs a movable platform to support a retained record. To transfer the record to the turntable, the platform is depressed below the turntable allowing the record to be intercepted by the turntable. When the platform is raised above the turntable, it picks up the record from the turntable.

U.S. Patent application, Ser. No. 148,304, of Elliott, now U.S. Pat. No. 4,326,284, illustrates another disc handling system wherein a retained record is supported on a stationary platform. When the turntable is raised above the platform, it lifts the record off the platform. To transfer the record back to the platform, the turntable is lowered below the platform to permit the record to be intercepted by the platform.

In these afore-mentioned disc transferring mechanisms, the record supporting platform has an opening through which the turntable passes to effect the transfer of a retained record to and from the turntable. To prevent the record from falling through the opening in the platform, the opening is made smaller than the record. Putting it differently, the foregoing record handling mechanisms lead to a turntable which is smaller than the record. Although a small turntable system works well, a problem may arise in that the turntable contacts the record over its recorded portion. Another undesirable feature of a small turntable system is that the record/turntable contact area is limited.

A record handling mechanism, pursuant to the subject invention, permits the use of a turntable which is larger than the record. The subject mechanism includes a record lifting finger which protrudes through one of the slots in the turntable to lift a record resting on a set of retractable record receiving pads disposed above the turntable. The record lifting finger drives the record against a stop located above the pads, and the pads are retracted out of the way. The record lifting finger is then lowered to a position beneath the turntable to gently deposit the record on the turntable for playback.

The sequence of operations is reversed to transfer the record back to the record supporting pads. The record lifting finger is raised to elevate a turntable-supported record to a position against the stop above the receiving pads. The record supporting pads are advanced, and the record lifting finger is then retracted to achieve the transfer of the record back to the pads. An empty record sleeve is reinserted into the player to retrieve the record/spine assembly.

In the Drawings:

FIG. 4 illustrates the side view of the video disc player of FIGS. 1 and 3;

FIGS. 5, 6 and 7 depict the chronological steps to transferring a disc from a turntable to a set of record receiving pads;

Figure 1:
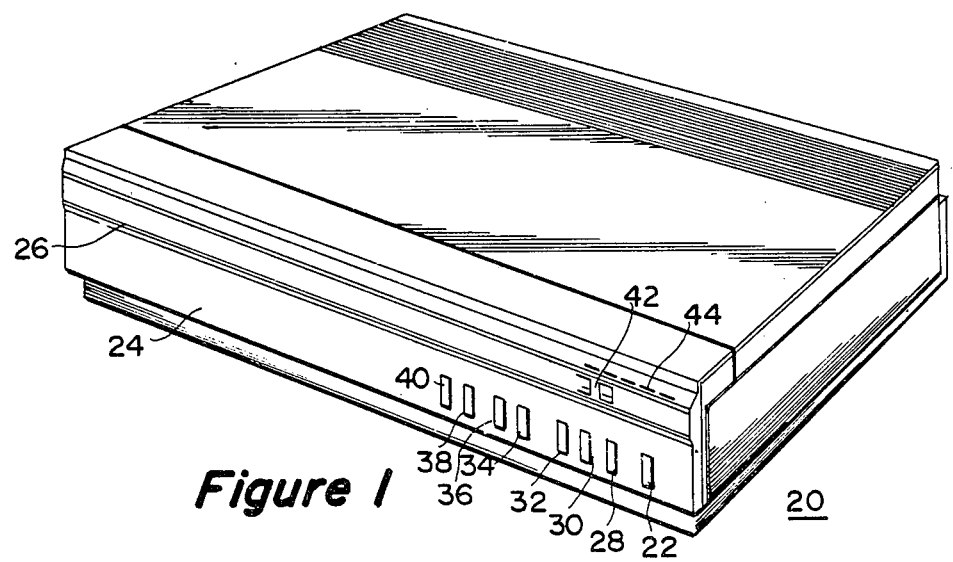
FIG. 1 shows a video disc player incorporating a record handling mechanism in accordance with the instant invention.
Figure 2:
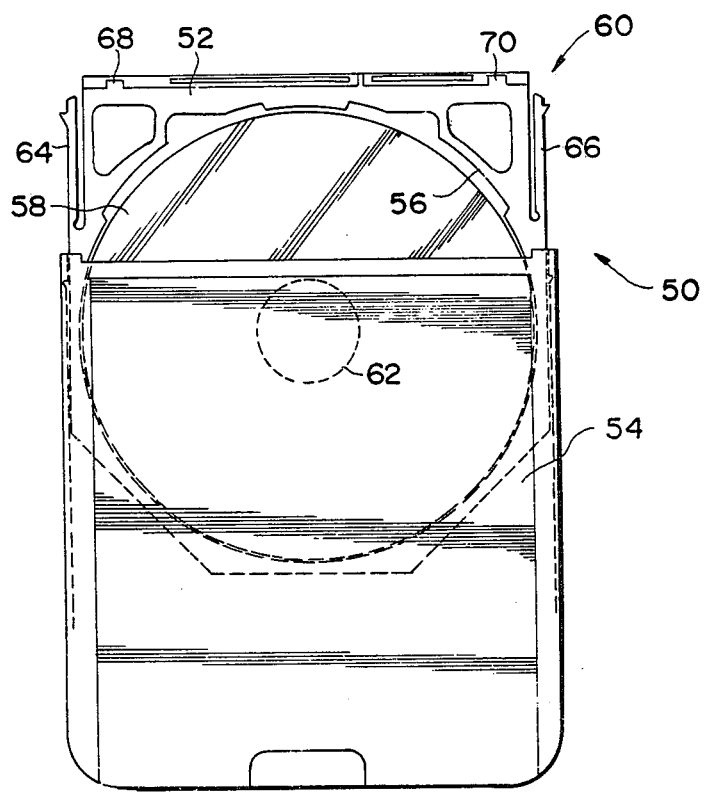
FIG. 2 represents a video disc caddy suitable for use with the player of FIG. 1 in the practice of the present invention.

Shown in FIG. 1 is a video disc player 20 incorporating the present disc handling mechanism. To play a disc, the player is turned on by pressing the "POWER" button 22 located on the front panel 24. A loaded record caddy, illustrated in FIG. 2, is inserted into the player through a caddy input slot 26, and the caddy sleeve is then extracted leaving the enclosed record inside the player. The record is automatically deposited on the turntable, and played back through a conventional television receiver. At any point during playback, the viewer can reject the remainder of the record by depressing the "REJECT" button 28, or interrupt the program by activating the "PLAY/PAUSE" button 30. The player has a "CHANNEL SELECT" button 32 to select any one of two audio channels in the event of a bilingual program disc. Buttons 34, 36, 38 and 40 permit the user to visually search the record in either direction at two different speeds (e.g., 16 and 120 times the normal playback speed). An LED indicator 42 shows the elapsed playing time. Various player functions are indicated by a plurality of light indicators 44.

The caddy 50, depicted in FIG. 2, consists of a planar record retaining spine 52 removably enclosed in a flat outer sleeve 54. The retaining spine 52 had an opening 56 in which a centrally-apertured record 58 is received forming a record/spine assembly 60. The numeral 62 denotes the record center hole. Integrally molded with the spine 52 are spine latch fingers 64 and 66 for releasably securing the spine 52 in its sleeve 54. The spine 52 has cutouts 68 and 70 in which the respective spine gripper members of the player are received to secure the spine to the player for reasons explained later.

Figure 3:
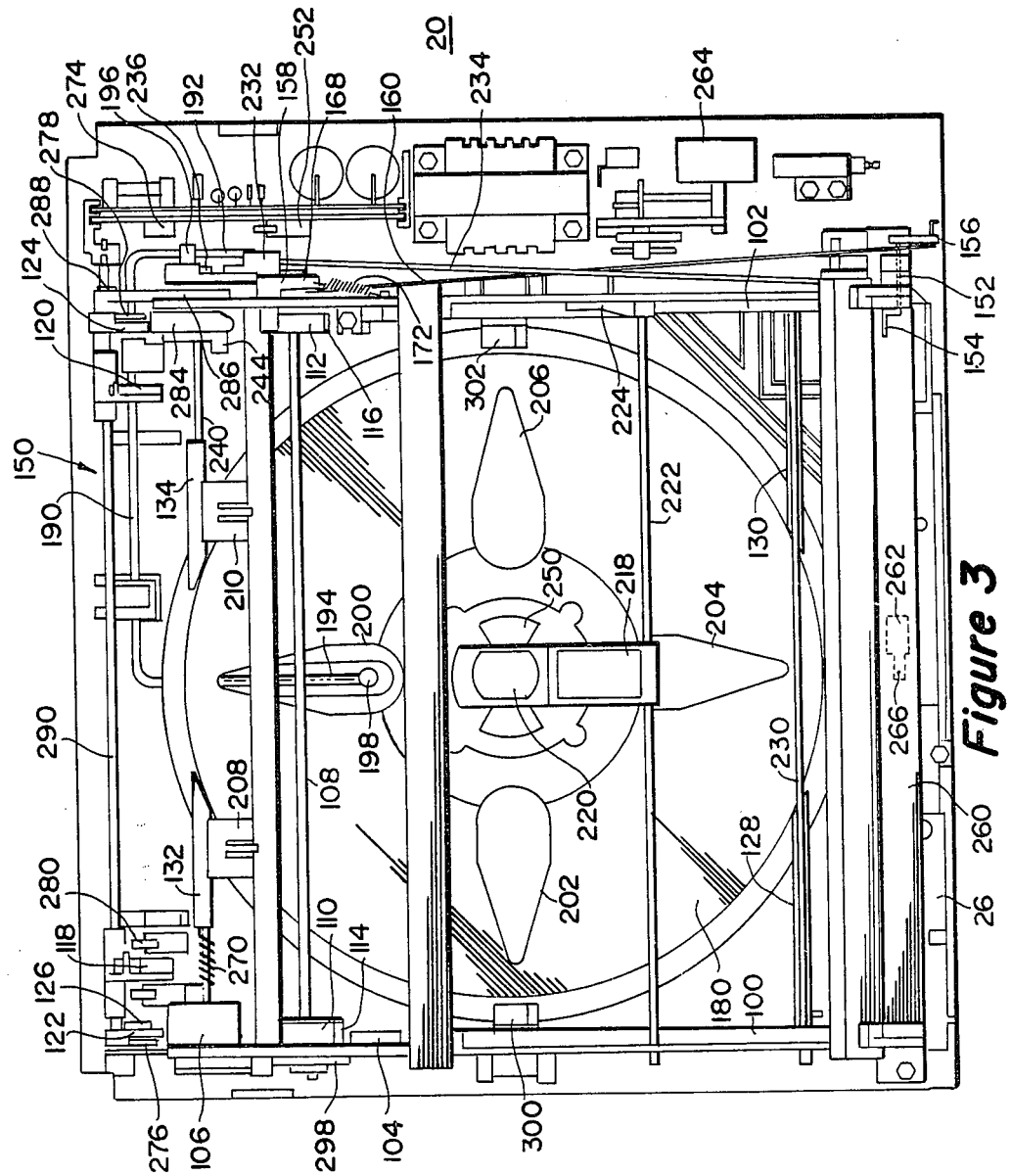
FIG. 3 is a top view of the FIG. 1 video disc player with its lid removed to expose the underlying details.

To load a record, a caddy is inserted into the player through the caddy input slot 26 along a pair of guide tracks 100 and 102 as shown in FIG. 3. When the caddy actuates a caddy sense switch 104, a function motor 106 is turned on. The motor 106 drives a shaft 108 carrying a set of caddy drive rollers 110 and 112. A pair of oppositely-disposed pinch rollers 114 and 116 are driven by a set of gear pulleys mounted on the drive shaft 108. The function motor 106, when turned on, drives the drive rollers 110, 112, 114, and 116 in a direction that pulls the caddy in.

When the caddy arrives at a fully inserted position in the player, a pair of spine gripper fingers 118 and 120 drop into the respective cutouts 68 and 70 in the spine 52 to lock the spine to the player. As the spine gripper fingers 118 and 120 engage the spine 52, a pair of latch defeat levers 122 and 124 enter into the sleeve 54 to deflect the respective spine latch fingers 64 and 66, and release the spine from its sleeve. The caddy actuates a microswitch 126 upon its arrival at the fully inserted location thereof to reverse the direction of rotation of the function motor 106. The function motor 106 then pushes the sleeve 54 out until it clears the drive rollers 110, 112, 114 and 116. The sleeve 54 is then manually extracted from the player leaving the record/spine assembly 60 resting on the front receiving pads 128, 130 and the back receiving pads 132, 134.

Figure 11:
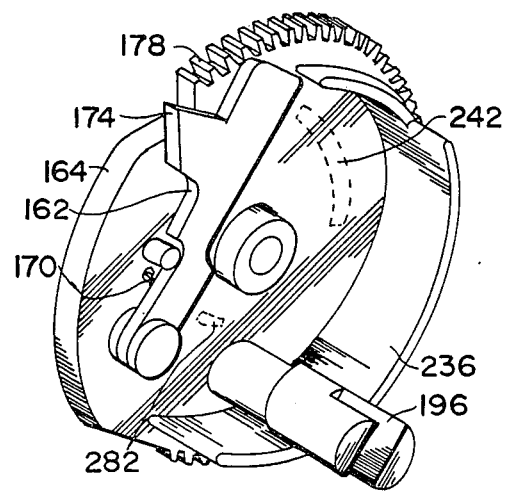
Figure 12:
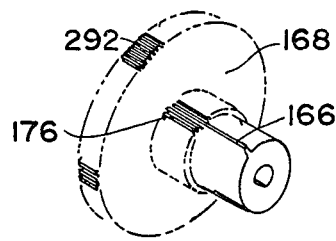

The instant record handling mechanism 150 will be explained next in conjunction with FIGS. 3-13. Located near the front end of the player is a pivotally-mounted member 152 which has a caddy sense portion 154 disposed in the caddy input slot 26. The other end 156 of the caddy sense member 152 acts upon a pawl actuating tab 158 by means of a connecting rod 160. (See FIGS. 8-10.) When a caddy 50 is inserted into the player through the caddy input slot 26, it turns the caddy sense member 152. The caddy sense member 152, when rotated by the caddy 50, advances the pawl actuating tab 158. The pawl actuating tab 158, in turn, causes a spring-biased pawl 162, disposed on a sequencing cam 164, to retract in order to prevent a tooth 166 disposed on a gear assembly 168 from engaging the pawl 162. The gear assembly 168 is mounted on the shaft 108 driven by the function motor 106. FIGS. 11 and 12, respectively, illustrate the sequencing cam assembly 164 and the gear assembly 168 in perspective.

Figure 8:
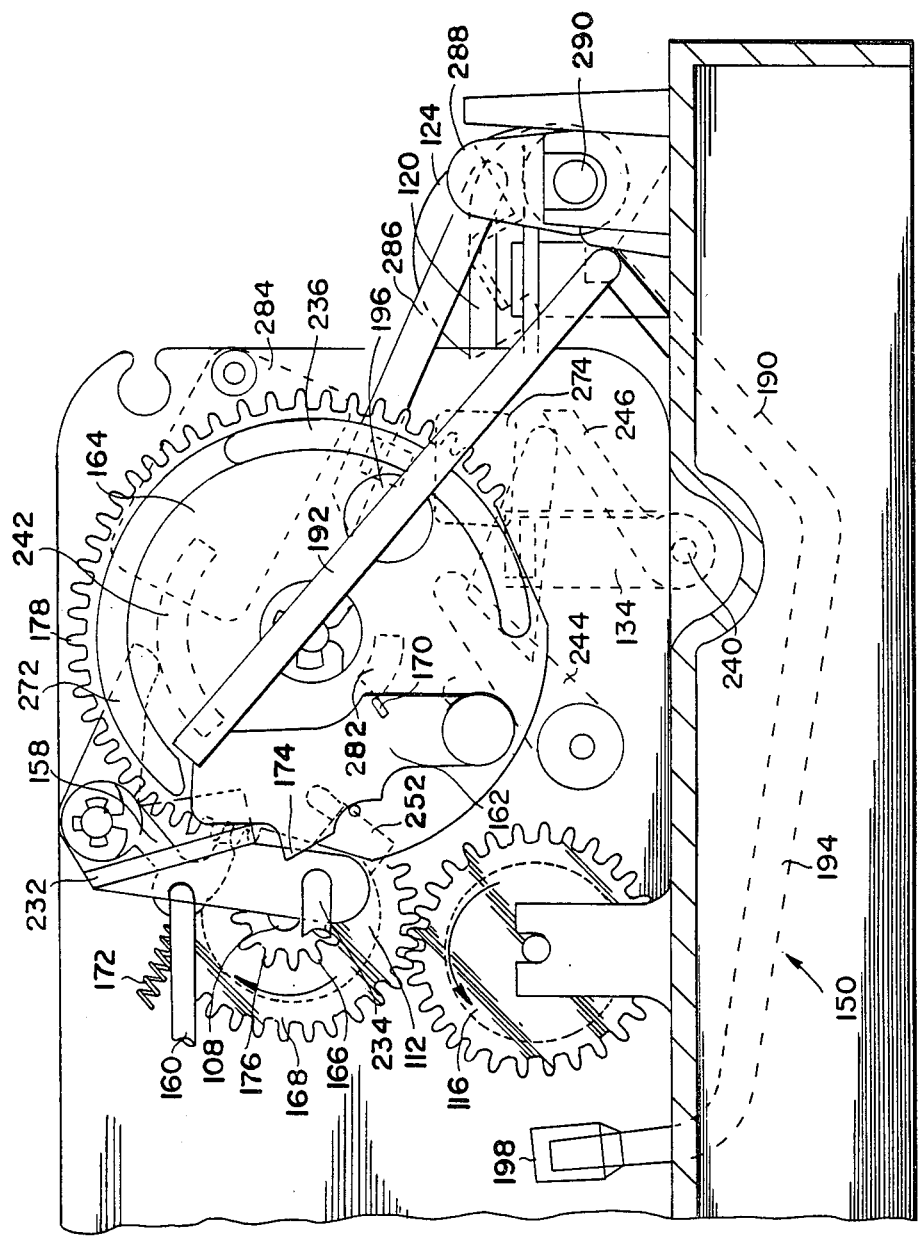
FIGS. 8 and 9 show the subject record handling mechanism in a load mode and a play mode respectively.

When the caddy sleeve 54 is completely extracted from the player (leaving the record/spine assembly 60 inside the player resting on the receiving pads 128, 130, 132 and 134), the caddy sense member 154 is released. As the caddy sense member 154 is freed, the springs 170 and 172, respectively, reset the pawl 162 and the pawl actuating tab 158 as shown in FIG. 8. The tooth 166 then engages an extension 174 on the pawl 162 to bring the teeth 176 disposed on the gear assembly 168 in engagement with the teeth 178 arranged on the sequencing cam 164. (It is noted that the tooth 166 on the gear assembly 168 and the extension 174 on the pawl 162 are coplanar, and that the teeth 176 on the gear assembly 168 and the teeth 178 on the sequencing cam 164 are coplanar. See FIGS. 11 and 12.) The function motor 106 thereupon drives the sequencing cam 164 in the counterclockwise direction, as shown in FIG. 8, to effect a transfer of the retained record 58 from the receiving pads 128, 130, 132 and 134 to a rotatable turntable 180 in the fashion described below.

A U-shaped record lifting member 190, consisting of an actuating portion 192 and a record engaging portion 194, is pivotally mounted in the player. (See FIGS. 1, 8 and 9.) The actuating portion 192 is slidably received in a slotted member 196 disposed on the sequencing cam 164. The record engaging portion 194 is fitted with a cap 198 to protect the record 58. As the sequencing cam 164 turns in the counter-clockwise direction from a load position (FIG. 8) to a play position (FIG. 9), the record engaging portion 194 rises through one of the holes 200, 202, 204 and 206 disposed in the turntable 180 to lift the record 58 from the receiving pads 128, 130, 132 and 134 as can be seen from FIG. 5. As the record engaging portion 194 moves up, it engages the underside of the record 58 in the central label area to lift the back end of the record from the rear receiving pads 132 and 134 until the topside of the record contacts a pair of stops 208 and 210 located above the receiving pads 128, 130, 132 and 134. The record engaging portion 194 then lifts the other end of the record 58 from the front receiving pads 128 and 130 to raise the record to a position, shown in FIG. 6, above the receiving pads.

The subject disc transfer mechanism 150, as previously indicated, permits the use of a full size turntable. As previously indicated, the turntable 180 has four oppositely-arranged openings 200, 204 and 202, 206. The stator 212 of a turntable drive motor 214 coact with a ring-shaped magnetic rotor 216 attached to the underside of the turntable 180 to position the turntable such that one of the turntable slots 200, 202, 204 and 206 overlies the record engaging portion 194 as the turntable is brought to a halt. Although this record handling mechanism 150 works well with a full size turntable, it is understood that it is also suitable for use with a reduced-size turntable.

Arranged over the turntable 180 is a pivotally mounted member 218 having a guide portion 220 which is dimensioned for reception in the record center hole 62. When the record is raised above the receiving pads 128, 130, 132 and 134 in the manner shown in FIG. 5, the guide portion 220 engages the record center hole to keep the record centered with respect to the retaining spine 52, which stays on the receiving pads. The pivotally mounted member 218 is attached to a shaft 222 carrying an actuating cam 224 at its one end. The location of the actuating cam 224 is such that when the caddy sleeve 54 is inserted into the player, the front edge thereof engages the cam to lift the guide portion 220 out of the caddy path.

Figure 13:
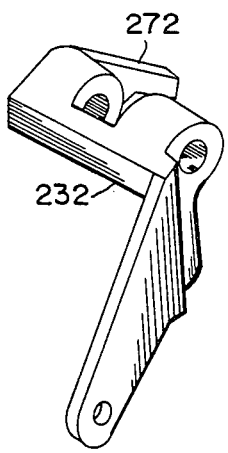

The front record receiving pads 128 and 130 are pivotally mounted on a bracket 230. The bracket 230 is linked to a rotatably-mounted actuating member 232 through a connecting rod 234. The details of the front pad actuating member 232 are shown in FIG. 13. As the sequencing cam 164 rotates in the counterclockwise direction from the position shown in FIG. 8, an arcuate rib 236 disposed on the sequencing cam acts upon the front pad actuating member 232 to displace the front receiving pads 132 and 134 out of the way as indicated in FIGS. 6-7.

Figure 9:
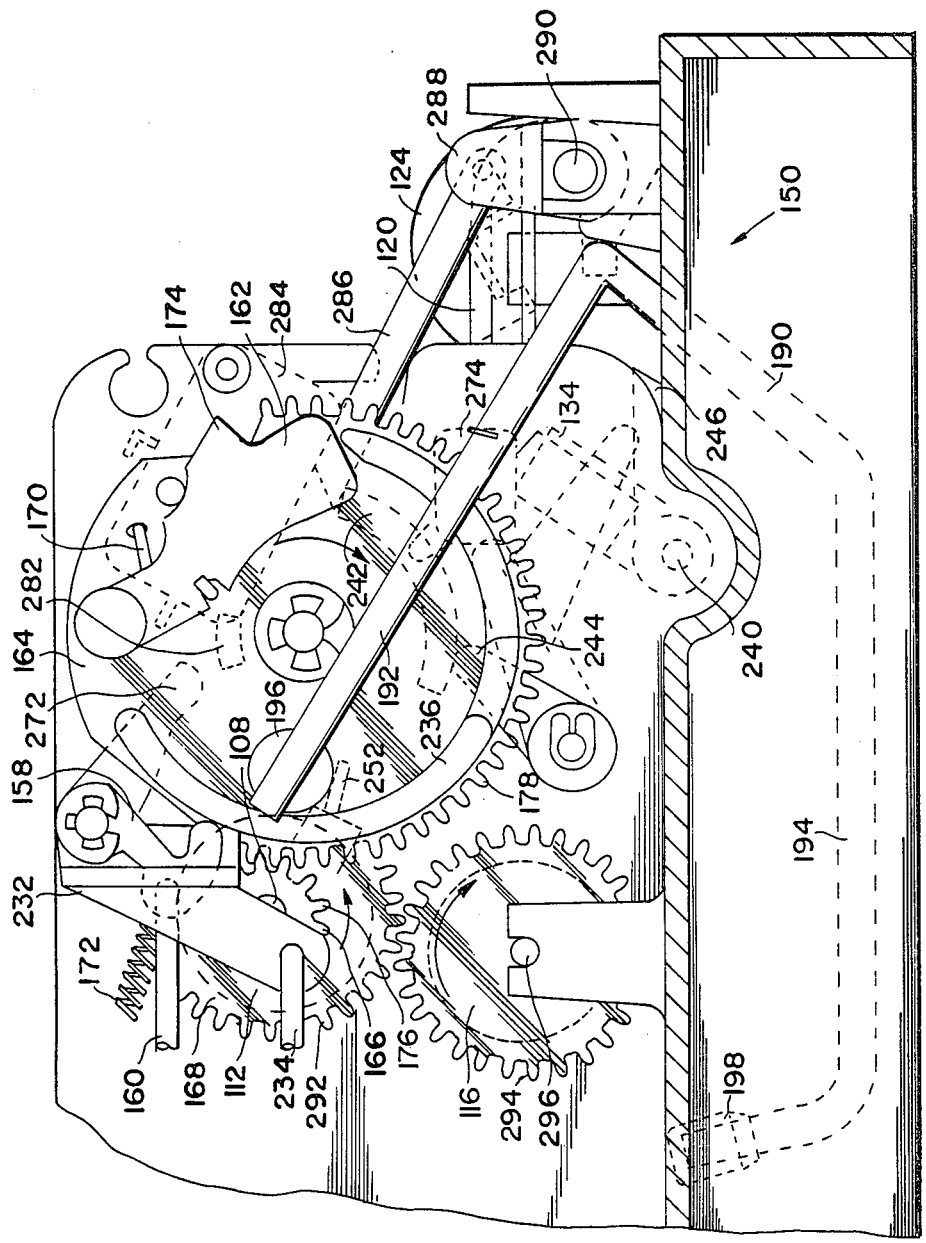
Figure 10:
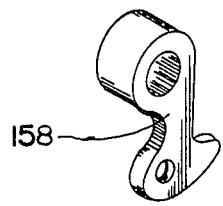
FIGS. 10-13 illustrate certain components of the instant record handling system.

A pivotally-mounted bracket 240 at the back end of the player supports the rear record receiving pads 132 and 134. As the sequencing cam 164 turns, a rib 242 disposed on the back side of the sequencing cam depresses a pivotally-mounted actuating member 244. The actuating member 244, in turn, acts upon a lever 246 secured to the support bracket 240 to rotate the rear receiving pads 132 and 134 out of the way as shown in FIGS. 7 and 9. Retraction of the receiving pads 128, 130, 132 and 134 by the sequencing cam 164 allows passage of the record between the receiving pads and the turntable 180 as will become clear later.

Figure 6:
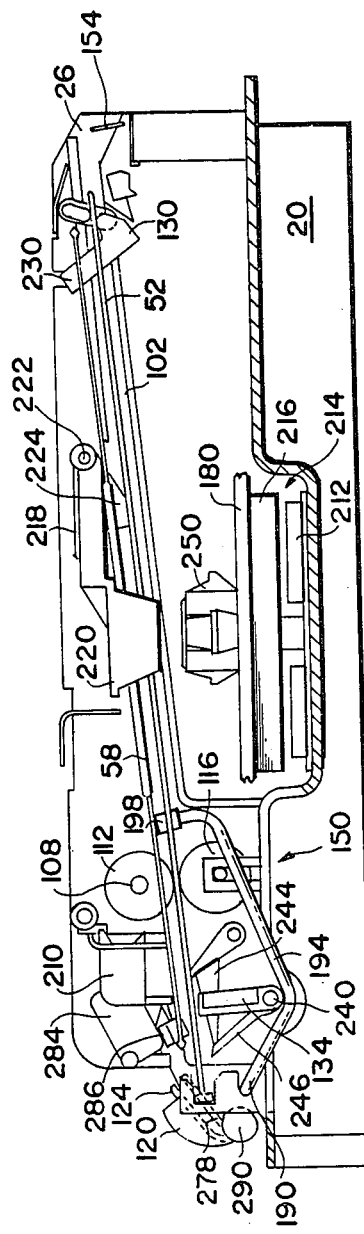
Figure 7:
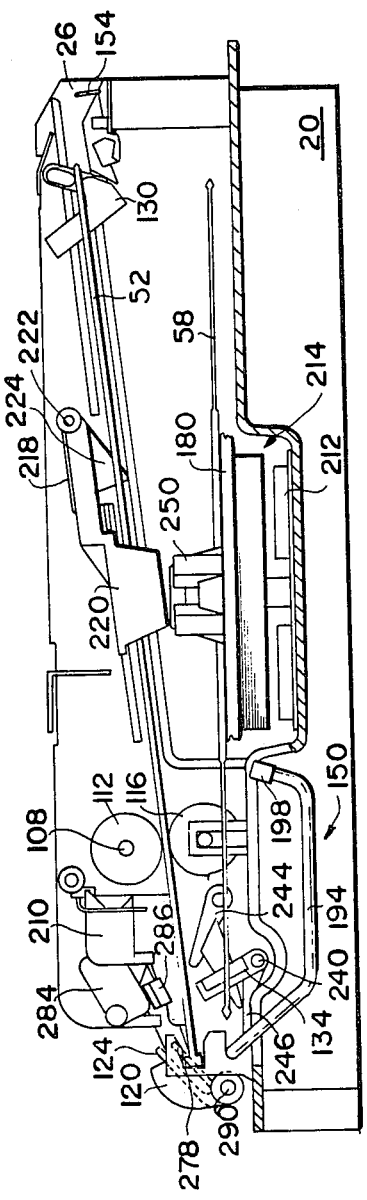

Further rotation of the sequencing cam 164 causes the record engaging portion 194 of the record lifting member 190 to retract from a raised position shown in FIG. 6 to a depressed position underneath the turntable 180 illustrated in FIG. 7. As the record lifting member 190 retracts out of the way, the record 58 is gently placed on the turntable 180. The turntable 180 is equipped with a record centering spindle 250 to guide the record 58 as it is lowered onto the turntable.

The slotted member 196 actuates a microswitch 252 to turn off the function motor 106 when the sequencing cam 164 arrives at the play position, depicted in FIG. 9, to stop the function motor 106 and to initiate the playback operations.

The sequence of steps involved in transferring the disc 58 from the record receiving pads 128, 130, 132 and 134 (FIG. 5) to the turntable 180 (FIG. 7), is summarized below.

The record lifting portion 194 is raised through one of the turntable slots 200, 204, 206 and 208. (See FIG. 5.)

The record 58 is lifted to a position against the stops 208 and 210 above the record receiving pads 128, 130, 132 and 134. (See FIG. 6.)

The front receiving pads 128 and 130 are retracted as the rib 236 on the sequencing cam 164 acts on the front pad actuating tab 232. (See FIGS. 6 and 7.)

The record lifting finger 190 starts its downward motion.

The rear receiving pads 132 and 134 are retracted as the rib 242 on the sequencing cam 164 depresses the rear pad actuating member 244. (See FIGS. 7 and 9.)

The record 58 is transferred to the turntable 180 as the record engaging portion 194 clears the underside of the turntable. (See FIGS. 7 and 9.)

The function motor 106 is switched off when the slotted member 196 mounted on the sequencing cam 164 activates the play switch 252 to initiate the playback sequence.

After the record 58 is transferred to the turntable 180, the turntable motor 214 is started. A carriage 260, whcih houses a pickup stylus cartridge 262, is advanced by a motor 264 to a position over the turntable, and a stylus 266 is lowered onto the record 58. During playback, the carriage 260 is driven by the motor 264 such that the carriage follows the stylus travel toward the record center.

At the end of the playback, the carriage drive motor 264 returns the carriage 260 to a starting position beyond the turntable periphery. The turntable motor 214 stops the turntable 180 at an angular position such that one of the cutouts 200, 204, 206 and 208 in the turntable is disposed over the record engaging portion 194 in the manner indicated previously.

The function motor 106 is then turned on to return the record 58 back to the receiving pads 128, 130, 132 and 134 for record retrieval. The function motor 106 drives the sequencing cam 164 in the clockwise direction as illustrated in FIG. 9. The sequence of events is as follows.

The record engaging portion 194 is raised through one of the holes 200, 202, 204 and 206 in the turntable 180.

The record 58 is lifted to a raised position against the stops 208 and 210. (See FIG. 6.)

A spring 270 advances the rear receiving pads 132 and 134 as the rib 242 on the sequencing cam 164 releases the rear pad actuating member 244. (See FIG. 5.)

The rib 242 on the sequencing cam 164 engages an extension 272 disposed on the front pad actuating tab 232, shown in FIG. 13, to restore the front receiving pads 128 and 130. (See FIG. 5.)

The record 58 is deposited on the record receiving pads 128, 130, 132 and 134 to redefine the record/spine assembly 60 as the record lifting finger 190 is withdrawn. (See FIG. 5.)

The slotted member 196 disposed on the sequencing cam 164 actuates a microswitch 274 to turn off the function motor 106. The location of the microswitch 274 is such that the function motor 106 is switched off when the record engaging portion 194 arrives at an intermediate position above the turntable 180, as can be seen in FIG. 4, to prevent rotation of the turntable.

To recapture the record/spine assembly 60 disposed on the receiving pads 128, 130, 132 and 134, the caddy sleeve 54 is inserted into the player. When the sleeve 54 engages the caddy sense switch 104, the function motor 106 dirves the rollers 110, 112, 114 and 116 in a direction that draws in the caddy sleeve. As the caddy sleeve 54 reaches the fully inserted position in the player, its front edge deflects the levers 276 and 278 disposed on the respective latch defeat fingers 122 and 124. The levers 276 and 278, in turn, lift the respective spine gripper fingers 118 and 120 to free the spine 52. The spine latch fingers 64 and 66 lock the spine 52 to the sleeve 54 during the arrival of the sleeve at the fully inserted position in the player.

The function motor 106 is reversed when the sleeve 54 operates the reverse switch 126 to drive the caddy 50 out until it clears the drive rollers 110, 112, 114 and 116. The caddy sense portion 154 located in the caddy input slot 26 retracts the pawl 162 to prevent the function motor 106 from driving the sequencing cam 164 while the sleeve 54 is inside the player. The caddy 50 releases the microswitch 104 as it is extracted from the player to stop the function motor 106.

The player has a spine sense switch 280 located near the back end thereof to preclude the caddy sense switch 104 from turning off the function motor 106 while the spine 52 is inside the player—e.g., when the sleeve 54 is extracted from the player leaving the record/spine assembly 60 therein. However, as the full caddy is withdrawn from the player, the microswitch 104 shuts off the function motor 106 in the manner indicated above.

When the player is turned off by depressing the POWER button 22, the function motor 106 is switched on again to drive the gear assembly 168 in the clockwise direction as viewed in FIG. 8. The tooth 166 engages the pawl 162 to draw the teeth 176 on the gear assembly 168 in engagement with the teeth 178 on the sequencing cam 164. As the sequencing cam 164 rotates in the counter-clockwise direction, the rib 236 disposed thereon acts upon the front pad actuating tab 232 to retract the front receiving pads 128 and 130. A caddy door (not shown) attached to the front receiving pads 128 and 130 closes the caddy input slot 26 as the front receiving pads are retracted. An inner arcuate rib 282 disposed on the backside of the sequencing cam 164 operates upon a shutoff switch 284 through an actuating lever 286 to turn off the power.

The shutoff switch actuating lever 286 is connected to a member 288 fixedly mounted on a shaft 290 carrying the spine gripper members 118, 120 and the latch defeat fingers 122, 124. When the spine 52 is inside the player, it acts upon the spine gripper members 118 and 120 to rotate the support shaft 290 to effect retraction of the shut off switch actuating lever 286. The shutoff switch actuating lever 286, when retracted, precludes the operation of the shutoff switch 284 by the inner rib 282 on the sequencing cam 164. In other words, the shutoff switch 284 is inoperative while the spine 52 is residing inside the player.

When the "POWER" switch 22 is depressed the next time to put the player in the load mode, the function motor 106 drives the sequencing cam 164 in the clockwise direction until the slotted member 196 acts upon the load switch 274 to shut the function motor off. During this time, the caddy door is opened, the front receiving pads 128 and 130 are restored, and the record lifting finger 190 is reset at the intermediate position in readiness to receive a loaded caddy as shown in FIG. 4.

The function motor 106 drives the caddy drive roller 116 by means of a set of gears 292 and 294 mounted, respectively, on the motor-driven shaft 108 and a shaft 296 carrying the drive roller 116. The gear 292 is a part of the gear assembly 168 illustrated in FIG. 12. Another set of gear pulleys 298 disposed on the other side of the player drive the caddy drive roller 114.

The player is further equipped with a pair of side receiving pads 300 and 302 for providing additional support to the record/spine assembly 60. The side pads 300 and 302 are swung out of the way when the front receiving pads 128 and 130 are retracted in order to allow the movement of the record 58 between the receiving pads 128, 130, 132, 134, 300 and 302 and the turntable 180.

What is claimed is:

1. In a record player for recovering prerecorded signals from a disc record supported on a turntable; a record handling apparatus comprising:
   (A) a stop mounted above a turntable-supported record;
   (B) a record lifting member having a record engaging portion;
   (C) means for mounting said record lifting member for movement between a first position where said record engaging portion is disposed below said turntable, and a second position where said record engaging portion extends above said turntable;
   (D) means for selectively raising and lowering said record engaging portion; the record engaging portion, when raised, engaging the underside of a turntable-supported record to lift said record to a raised position against said stop;
   (E) a record receiving pad;
   (F) means for mounting said record receiving pad above said turntable for movement between an advanced position and a retracted position in said advanced position, said record receiving pad being in the path of a record between said turntable-supported position and said raised position; in said retracted position, said record receiving pad being maintained out of said path; and
   (G) means for selectively advancing and retracting said record receiving pad; wherein to transfer a record from said turntable to said receiving pad, said pad is retracted out of the way of said record, said record lifting member is raised to lift said record above said pad, said pad is advanced, and said record lifting member is lowered to deposit said record on said pad.

2. The apparatus as defined in claim 1 further including a second stop arranged above a turntable-supported record such that said stops are symmetrically disposed in respect of said record lifting member.

3. The apparatus as defined in claim 1 for use with a record having a prerecorded annular region surrounding a central unrecorded region; wherein said location of said record lifting member is such that said record engaging portion engages a turntable-supported record within said central unrecorded region thereof as said record engaging portion rises above said turntable.

4. The apparatus as defined in claim 1 for use with a turntable which is at least as large as said record; said turntable having a slot which is located such that said record engaging portion passes through said slot to raise and lower said record.

5. The apparatus as defined in claim 1 for use with a turntable having a spindle adapted for engagement with the center hold of a record as said record is lowered for placement on said turntable; said apparatus further including a record guide member mounted above said spindle; said record guide member being subject to reception in said record center hole as said record is raised above said turntable spindle, whereby said record is centered in respect of said record receiving pad.

6. The apparatus as defined in claim 5 further having means for movably mounting said record guide member so that said record can be freed by raising said record guide member above said record.

7. In a record player for recovering prerecorded signals from a disc record supported on a turntable; a record handling apparatus comprising:
   (A) a stop mounted above a turntable-supported record;
   (B) a record lifting member having a record engaging portion;
   (C) means for mounting said record lifting member for movement between a first position where said record engaging portion is disposed below said turntable, and a second position where said record engaging portion extends above said turntable;
   (D) means for selectively raising and lowering said record engaging portion; the record engaging portion, when raised, engaging the underside of a turntable-supported record to lift said record to a raised position against said stop;
   (E) a set of record receiving pads;
   (F) means for mounting said record receiving pads above said turntable for movement between an advanced position and a retracted position; in said advanced position, said record receiving pads being in the path of a record between said turntable-supported position and said raised position; in said retracted position, said record receiving pads being maintained out of said path; and
   (G) means for selectively advancing and retracting said record receiving pads; wherein to transfer a record from said turntable to said receiving pads, said pads are retracted out of the way of said record, said record lifting member is raised to lift said record above said pads, said pads are advanced, and said record lifting member is lowered to deposit said record on said pads.

8. The apparatus as defined in claim 7 further including a sequencing means; said sequencing means serving to raise said record lifting member to elevate said record above said pads, to withdraw said pads out of said record path, and to lower said record lifting member to deposit said record on said turntable.

9. The apparatus as defined in claim 7 further including:
means for coordinating the operation of said raising and lowering means with the operation of said advancing and retracting means; in transferring a turntable-supported record to said receiving pads, said coordinating means serving to retract said pads out of said record path, to raise said record lifting member to elevate said record above said pads, to advance said pads, and to lower said record lifting member to deposit said record on said pads.

10. The apparatus as defined in claim 9 wherein said coordinating means serves to transfer a record resting on said record receiving pads to said turntable by raising said record lifting member to lift said record above said pads, by retracting said pads out of the way of said record, and by lowering said record lifting member to release said record on said turntable.

* * * * *